United States Patent
Rajendran et al.

(10) Patent No.: US 8,428,571 B2
(45) Date of Patent: Apr. 23, 2013

(54) UNINTERRUPTED USAGE AND ACCESS OF PHYSICALLY UNREACHABLE HANDHELD DEVICE

(75) Inventors: Abirami Rajendran, Tamil Nadu (IN); Nikita Davda, Tamil Nadu (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/273,977

(22) Filed: Oct. 14, 2011

(65) Prior Publication Data

US 2012/0034902 A1  Feb. 9, 2012

Related U.S. Application Data

(62) Division of application No. 12/407,047, filed on Mar. 19, 2009, now Pat. No. 8,107,942.

(51) Int. Cl.
*H04M 3/42* (2006.01)

(52) U.S. Cl.
USPC ............ 455/418; 455/411; 455/466; 709/203

(58) Field of Classification Search .................. 455/418, 455/466, 411; 709/203
See application file for complete search history.

(56) References Cited

U.S. PATENT DOCUMENTS

| | | | |
|---|---|---|---|
| 5,857,144 A * | 1/1999 | Mangum et al. | 455/11.1 |
| 7,181,501 B2 | 2/2007 | Defosse | |
| 2002/0129141 A1 | 9/2002 | Sogabe et al. | |
| 2003/0096626 A1 * | 5/2003 | Sabo et al. | 455/466 |
| 2004/0179039 A1 | 9/2004 | Blattner et al. | |
| 2005/0169445 A1 | 8/2005 | Harris | |
| 2006/0161473 A1 | 7/2006 | Defosse | |
| 2007/0047707 A1 | 3/2007 | Mayer et al. | |
| 2007/0112907 A1 | 5/2007 | Defosse | |
| 2007/0157018 A1 | 7/2007 | Simon et al. | |
| 2008/0133930 A1 * | 6/2008 | Moshir et al. | 713/183 |
| 2008/0263178 A1 | 10/2008 | Hogue | |
| 2009/0147937 A1 | 6/2009 | Sullhan et al. | |
| 2010/0093379 A1 | 4/2010 | Neely et al. | |
| 2010/0124907 A1 | 5/2010 | Hull et al. | |
| 2010/0240401 A1 | 9/2010 | Rajendran et al. | |

* cited by examiner

*Primary Examiner* — Danh Le
(74) *Attorney, Agent, or Firm* — Schwegman Lundberg & Woessner, P.A.

(57) ABSTRACT

Techniques for uninterrupted usage and access to physically unreachable handheld devices are provided. A physically unreachable handheld device includes an automated agent that is configured to authenticate a message received without manual intervention and to forward information from the handheld device to another remote and different handheld device.

7 Claims, 3 Drawing Sheets ic # UNINTERRUPTED USAGE AND ACCESS OF PHYSICALLY UNREACHABLE HANDHELD DEVICE

RELATED APPLICATIONS

The present application is a divisional of, and claims priority to U.S. Ser. No. 12/407,047, entitled: "Uninterrupted Usage and Access of Physically Unreachable Handheld Device," filed on Mar. 19, 2009, now issued as U.S. Pat. No. 8,107,942, and which presently stands allowed; the disclosure of which is incorporated by reference herein in its entirety.

BACKGROUND

Network connectivity and portable devices have revolutionized work and communication in today's modern economy. It no longer matters where some one physically resides in the world because work, communication, and information can flow to virtually anywhere on the globe.

Furthermore, portable devices are getting smaller, faster, and easier to use. In fact, many individuals now find their portable handheld devices indispensible and are often lost when they are without their handheld devices.

Conventional solutions provide mechanisms to secure portable devices. For example, existing management and software technologies can remotely active a self destruction process when a user reports a portable handheld device stolen or lost. This provides security by ensuring that the device is wiped clean of information that belongs to the user that lost the device or had the device stolen.

But, very few solutions exist when a user has not had a device lost/stolen. This occurs when a user forgets his/her handheld device but knows that it is secure and not lost. For example, a user may go on a business trip or be away from home and realize that the user's handheld device was left back at home or in the office. The user may need to do work or may need some vital information. Furthermore, the user may be expecting an important phone call and without the device there is little chance that the user can receive that call.

The user may need contact information, calendar information, documents, email, phone calls, etc. All this information would normally be instantly accessible to the user if the user was in physical possession of his/her handheld device.

Moreover, the situation where a user forgets his/her handheld device at home or the office is a far more frequent and likely scenario then the user actually losing or having the device stolen.

Thus, techniques are needed for uninterrupted usage and access to portable handheld devices when those devices are not physically in the possession of their owners.

SUMMARY

In various embodiments, techniques for uninterrupted usage and access to physically unreachable handheld devices are provided. More specifically, and in an embodiment, a method is provided for usage and access to a physically unreachable handheld device. The method processes without manual intervention on a portable handheld device. Specifically, a text message is automatically detected. The text message has a predefined format with a predefined content, and the text message is also identified as being received from a remote and different device. The predefined content is verified. Next, a secret is sent to an email address that is associated with an owner of the portable handheld device. Then, the secret is received in a second text message from the remote and different device; the second text message in the predefined format and the secret is verified. Finally, a predefined policy is instituted to forward information from the portable handheld device to the remote and different device.

DETAILED DESCRIPTION

A "portable handheld device" includes a digital phone, a personal digital assistant (PDA), or a combination of digital phone and PDA device. A "remote portable handheld device" is also a digital phone, a PDA, or a combination of digital phone and PDA device.

The remote portable handheld device communicates with the portable handheld device over a wireless communication service provider network, such as but not limited to AT&T®, T-Mobile®, Verizon®, and others. The communication between the remote portable handheld device and the portable handheld device occurs via a messaging service, such as Short Message Service (SMS) protocol, Instant Message (IM), email, etc.

The term "information" includes text messages, phone calls, call logs, text message logs, instant messages, instant message logs, calendar data, contact data, documents, task data, music, audio files, videos, pictures, and other types of content that can exists on a digital phone and/or PDA.

Various embodiments of this invention can be implemented as software instructions on phones and/or PDA's where those phones or PDA's are configured to execute the software.

It is within this context, that various embodiments of the invention are now presented with reference to the FIGS. 1-4.

Figure 1:
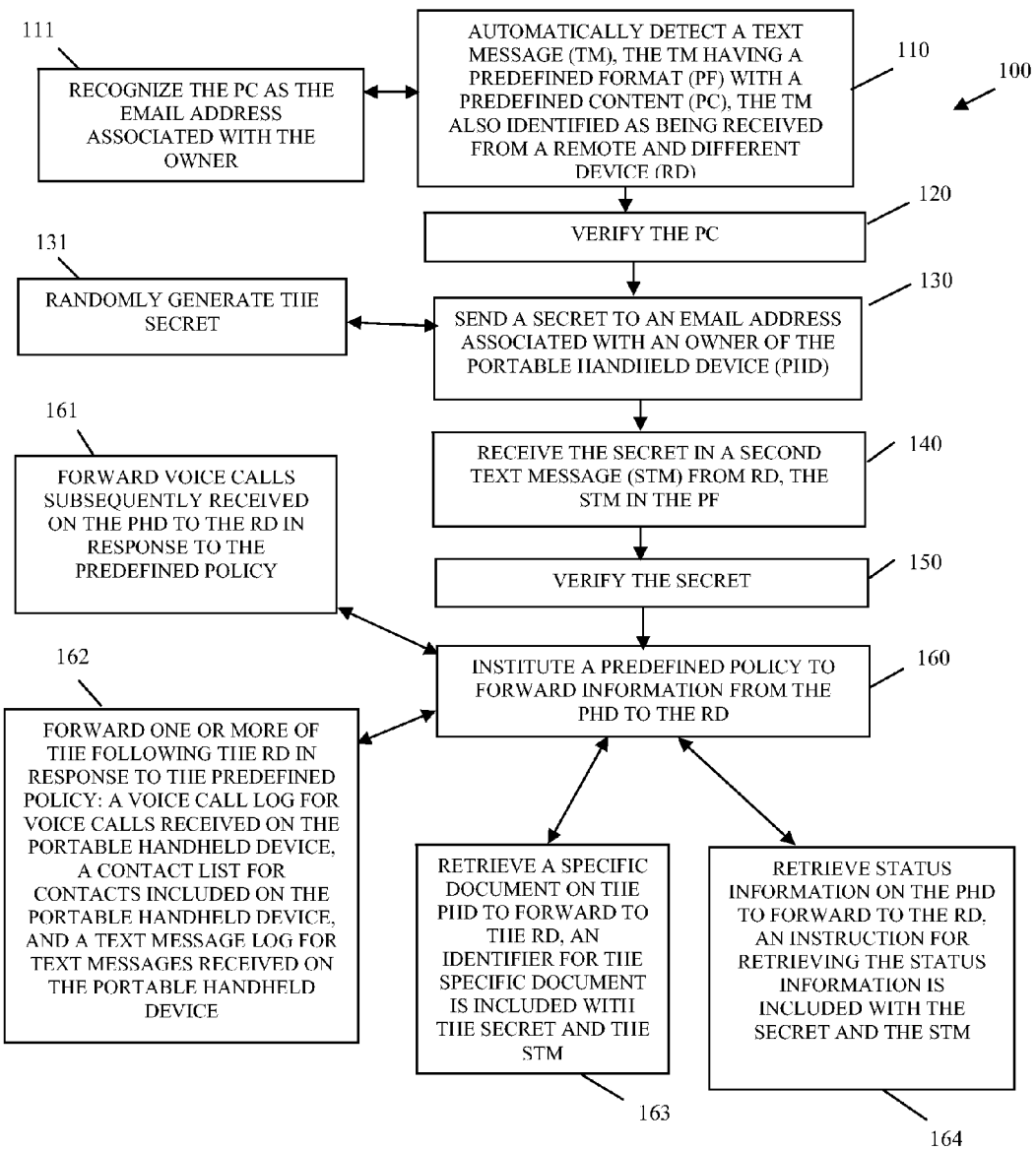
FIG. 1 is a diagram of a method for usage and access to a physically unreachable handheld device, according to an example embodiment.

FIG. 1 is a diagram of a method 100 for usage and access to a physically unreachable handheld device, according to an example embodiment. The method 100 (hereinafter "remote handheld access service") is implemented as instructions in a machine-accessible and computer-readable storage medium. The instructions when executed by a machine (portable handheld device, digital phone, combined phone and PDA), which is configured to process the remote handheld access service, perform the processing depicted in FIG. 1. The remote handheld access service is also operational over a network. The network may be accessible via connections that are wired, wireless, or a combination of wired and wireless.

Again, the remote handheld access service processes on a portable handheld device, such as a digital phone and/or PDA. The remote handheld access service is entirely automated and is processed without any manual intervention on the portable handheld device.

Also, the portable handheld device is physically unreachable from its owner. This can occur for a variety of reasons, such as but not limited to, the owner leaving home without it or leaving the office without it. The portable handheld device is on but not in the possession of the owner and cannot be readily accessed.

At 110, the remote handheld access service automatically detects a text message. The text message has a predefined format with a predefined content. The text message is also received from a remote and different handheld device (RD). Here, the owner may borrow another handheld device or may have another handheld device and uses this device as the RD to send the text message in the predefined format and with the predefined content.

The predefined content basically activates the remaining processing of the remote handheld access service. So, the remote handheld access service scans the content of incoming text messages to the portable handheld device (PHD) and when it encounters the predefined format with the predefined content, the remaining processing takes place. It is also noted that the PHD acquires the network address or phone number of the sender of that text message (by virtue of the RD contacting the PHD via a text message), which is the RD. Thus, the remote handheld access service can communicate back with that RD automatically and, as stated above, without manual intervention of any user.

According to an embodiment, at 111, the remote handheld access service recognizes the predefined content as an email address (discussed below with reference to the processing at 130). The email address is one that was registered on the PHD by an owner of the PHD. That is, the owner using the PHD registers the email address with the remote handheld access service that processes on the PHD.

As an example, the predefined format may be the email address enclosed in characters, such as "<<email_address>>." It is recognized that any special character or set of characters that enclose the email address or predefined content can be used when the remote handheld access service is configured to recognize this predefined format and predefined content.

At 120, the remote handheld access service verifies the predefined content. In other words, the remote handheld access service checks to see if the email address is registered and known to the remote handheld access service and if it is, then the predefined content is verified.

At 130, the remote handheld access service sends a secret to the email address of the owner of the PHD. The secret is some code or string of characters that is generated or provided by the remote handheld access service.

According to an embodiment, at 131, the remote handheld access service randomly generates the secret before the secret is sent. So, it is to be noted that FIG. 1 does not impart a sequential ordering since the secret is randomly generated before it is in fact sent. FIG. 1 is presented for purposes of illustration of various aspects of the remote handheld access service.

In some situations, the remote handheld access service can send a set of instructions or steps to take to the email address. This may be multiple steps that need to be taken by the owner. For example, the steps in the email may say text back the secret and make a phone call from the RD to the PHD and do these two steps in a particular predefined order.

At 140, the remote handheld access service receives the secret in a second text message from the RD, where the second text message is in the same predefined format that the first or original text message was received in.

At 150, the remote handheld access service verifies the secret. Here again, this may be verifying multiple steps that were provided via the secret to the email address of the owner.

Alternatively, this may be a simple compare to see that the second text message is in the predefined format and includes the secret or code.

At 160, the remote handheld access service institutes a predefined policy to forward information from the PHD to the RD.

In an embodiment, at 161, the remote handheld access service forwards voice calls that are subsequently received on the PHD to the RD in response to the predefined policy. So, the predefined policy states that the remote handheld access service is to forward calls received to the RD. In some cases, a third text message can be sent in the predefined format instructing the remote handheld access service to turn off the call forwarding to the RD.

In another situation, at 162, the remote handheld access service forwards one or more of a variety of information in response to the predefined policy to the RD. This information can include one or more of the following: a voice call log for voice calls received on the PHD, a contact list for contacts included on the PHD, and a text message log for text messages received on the PHD.

In still another case, at 163, the remote handheld access service retrieves a specific document on the PHD to forward to the RD. Here, an identifier for the specific document is included with the secret and the second text message.

In yet another circumstance, at 164, the remote handheld access service retrieves status information on the PHD to the RD. This can occur with an instruction for retrieving the status information that is included with the secret and the second text message.

Figure 2:
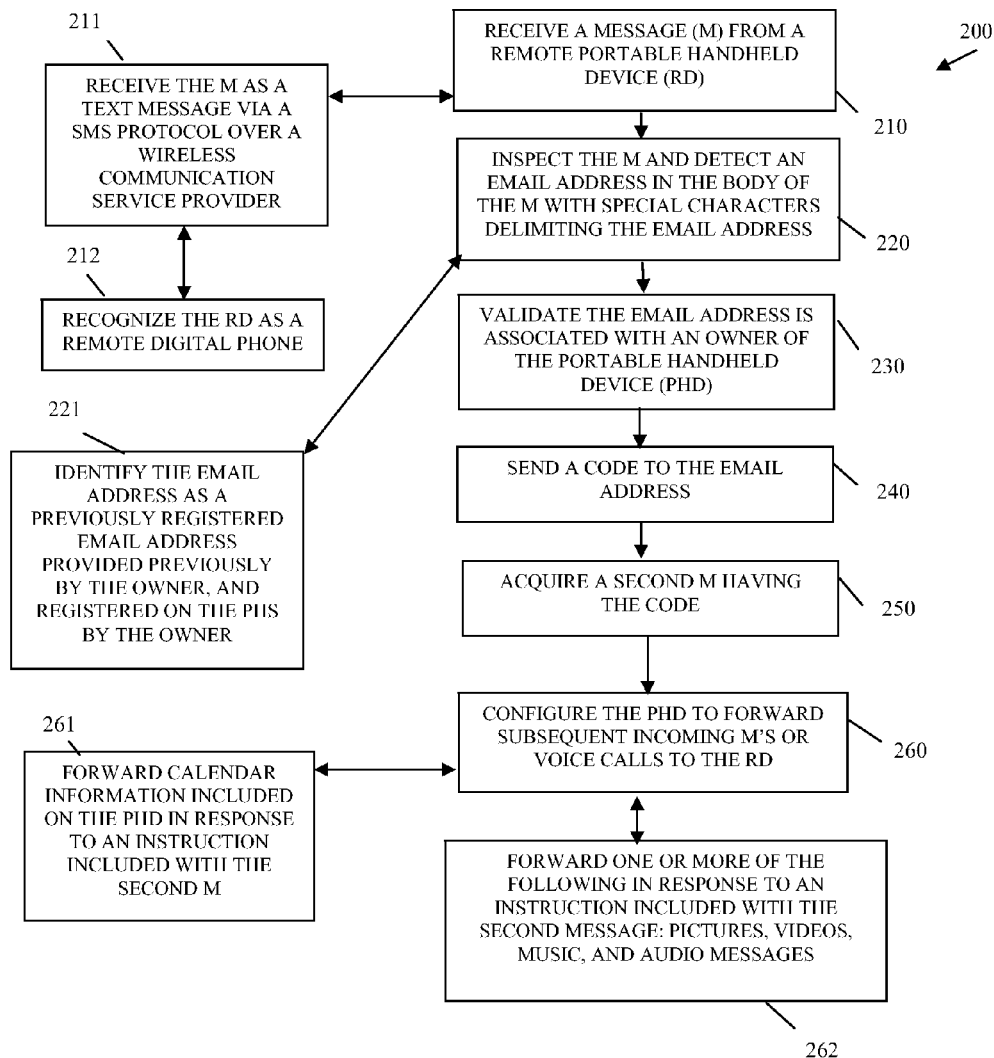
FIG. 2 is a diagram of another method for usage and access to a physically unreachable handheld device, according to an example embodiment.

FIG. 2 is a diagram of another method 200 for usage and access to a physically unreachable handheld device, according to an example embodiment. The method 200 (hereinafter "handheld device access service") is implemented as instructions in a machine-accessible and computer-readable storage medium. The instructions when executed by a machine (handheld device, processor, etc.), which is configured to process the handheld device service, perform the processing depicted in FIG. 2. The handheld device service is also operational over and processes within a network. The network may be accessed via connections that are wired, wireless, or a combination of wired and wireless.

The handheld device service presents another and in some ways an enhanced perspective of the remote handheld access service, which was discussed above with reference to the method 100 of the FIG. 1.

At 210, the handheld device service receives a message from a remote portable handheld device.

In an embodiment, at 211, the handheld device service receives the message as a text message via a Short Message Service (SMS) protocol over a wireless carrier communication service provider network.

Continuing with the embodiment at 211 and at 212, the handheld device service recognizes the remote handheld device as a remote digital phone (type of RD) that is operated by an owner of the portable handheld device (PHD). Alternatively, the remote handheld device may be operated by a delegate person under the authorization and direction of the owner of the PHD.

In other cases the message can be an Instant Message (IM). In such a circumstance, the handheld device service monitors an IM account of the owner or IM messages being received on the PHD.

At 220, the handheld device service inspects the message and detects an email address in the body of the message with special delimiting characters that delimit the email address.

According to an embodiment, at 221, the handheld device service identifies the email address as a previously registered email address provided previously by the owner of the PHD. The owner registers with the handheld device service via the PHD.

At 230, the handheld device service validates the email address making sure that the email address is associated with the owner of the PHD.

At 240, the handheld device service sends a code to the email address. Again, this code can be randomly generated by the handheld device service.

At 250, the handheld device service subsequently acquires and detects a second message having the code and being sent from the RD.

At 260, and after verification of the received code, the handheld device service configures the PHD to forward subsequent incoming messages or voice calls to the RD.

According to an embodiment, at 261, the handheld device service forwards calendar information included on the PHD in response to an instruction included with the second message and the code.

In still another case, at 262, the handheld device service forwards a variety of information in response to an instruction included with the second message and the code. This information can include, but is not limited to, pictures, videos, music, audio messages, instant messages, and other information included and accessible on the PHD.

Figure 3:
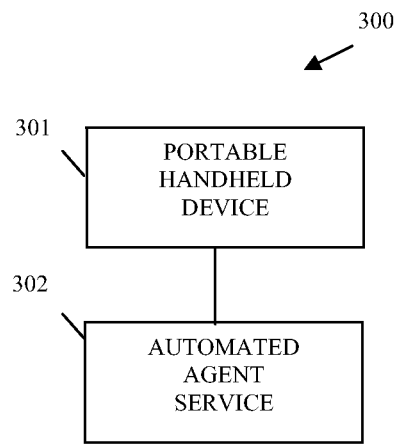
FIG. 3 is a diagram of a remote handheld device access system, according to an example embodiment.

FIG. 3 is a diagram of a remote handheld device access system 300, according to an example embodiment. The remote handheld device access system 300 is implemented as instructions (within a machine-accessible and computer-readable storage medium) that when executed by a machine (portable handheld device, processor, etc.) perform, among other things, the processing discussed above with respect to the methods 100 and 200 of the FIGS. 1 and 2, respectively. Moreover, the remote handheld device access system 300 is operational over a network, and the network is accessible over connections that may be wired, wireless, or a combination of wired and wireless.

The remote handheld device access system 300 includes a portable handheld device 301 and an automated agent service 302. Each of these components of the remote handheld device access system 300 and their interactions with one another will now be discussed in detail.

The portable handheld device 301 can be a digital phone, a PDA, or a combination digital phone and PDA.

The agent service 302 is implemented in a computer-readable storage medium of the portable handheld device 301 and executes on one or more processors of the portable handheld device 301. The agent service 302 operates without any manual intervention on the portable handheld device 301. So, the agent service 302 operates when the portable handheld device 301 is powered on but physically not accessible to an owner of the portable handheld device 301. Example processing associated with the agent service 302 was presented above with respect to the methods 100 and 200 of the FIGS. 1 and 2, respective.

The agent service 302 is configured to automatically and dynamically detect predefined formatted instructions that activate the agent service 302 on the portable handheld device 301 to perform a variety of actions on behalf of the owner of the portable handheld device 301. The agent service 302 actively monitors text messages or instant messages that are being received on the portable handheld device 301 looking for the predefined formatted instructions.

The predefined formatted instructions direct or instruct the agent service 302 to forward information from the portable handheld device 301 to a remote portable handheld device.

In an embodiment, the portable handheld device 301 is a first digital phone and the remote portable handheld device is another different portable phone.

Continuing with the previous embodiment, the predefined formatted instructions are received as SMS text messages over a wireless communication service provider network.

Also, the predefined formatted instructions can direct the agent service to forward one or more of the following types of information from the portable handheld device 301 to the remote portable handheld device: incoming calls that are being received on portable handheld device 301, a call log on the portable handheld device 301, requested calendar data from the portable handheld device 301, a text message log on the portable handheld device 301, incoming text messages that are being received on the portable handheld device 301, a requested document on the portable handheld device 301, status information for the portable handheld device 301, a requested picture on the portable handheld device 301, a request song on the portable handheld device 301, a requested video on the portable handheld device 301, a requested audio message on the portable handheld device 301, a contact list on the portable handheld device 301, instant messages being received on the portable handheld device 301, an instant message log on the portable handheld device 301, and a requested content on the portable handheld device.

According to an embodiment, the agent service 302 is configured via one of the predefined formatted instructions to forward selective portions of the information to one or more additional devices. So, the owner may want calls forwards to the remote portable handheld device but may want text messages forwarded to an email address associated with another device. A variety of circumstances can exist here where the owner may want some content sent to different devices.

In another situation, the agent service 302 employs a security procedure via an email address of an owner of the portable handheld device 301 for purposes of authenticating the predefined formatted instructions before information is forwarded to the remote portable handheld device. Examples for this situation and other situations (multiple steps) were provided above in detail with reference to the methods 100 and 200 of the FIGS. 1 and 2, respectively.

Figure 4:
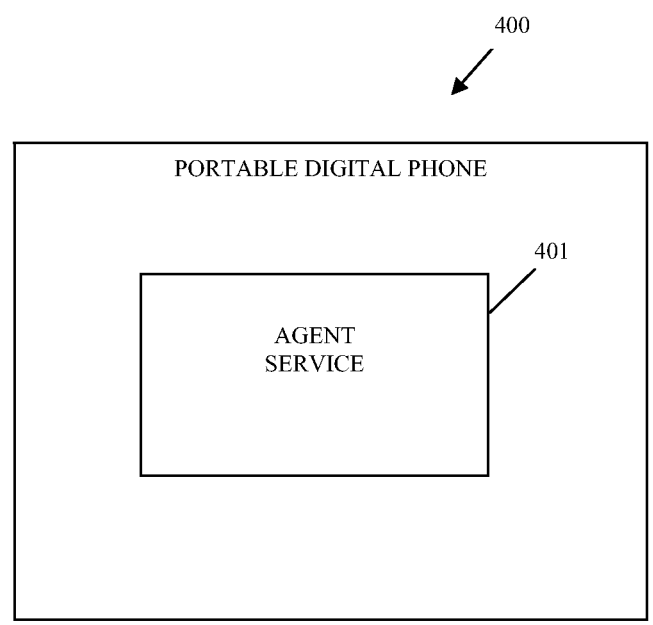
FIG. 4 is a diagram of portable digital phone configured to process the methods depicted in the FIGS. 1 and/or 2, according to an example embodiment.

FIG. 4 is a diagram of portable digital phone 400 configured to process the methods depicted in the FIGS. 1 and/or 2, according to an example embodiment. Communication to and from the portable digital phone 400 occurs over a wireless service provider's network.

The portable digital phone 400 includes an agent service 401.

The agent service 401 is implemented in a computer-readable storage medium and adapted to execute on one or more processors of the portable digital phone 400. Processing associated with the agent service 401 was presented above in detail with reference to the methods 100 and 200 of the FIGS. 1 and 2, respective, and with respect to the system 300 of the FIG. 3.

The agent service 401 is configured to operate without manual invention on the portable digital phone 400. So, when the portable digital phone 400 is powered on but not accessible or not reachable to its owner, the agent service 401 processes on the portable digital phone 400.

The agent service 401 automatically detects an email address that is embedded with predefined characters and received on the portable digital phone 400 as a text message that is send to the portable digital phone 400 over a wireless communication provider network from a different digital phone.

In response to this detected information, the agent service 401 generates a secret that is sent to the email address. Subsequently, the agent service 401 detects a second text message received on the portable digital phone 400 from the different digital phone.

In response to the second text message having the secret, the agent service 401 forwards incoming information that is being received at or on the portable digital phone 400. The incoming information forwarded to the different digital phone.

According to an embodiment, the agent service 401 is configured to receive instructions after the secret is verified to forward selective content residing on the portable digital phone 400 to the different digital phone.

In another situation, the agent service 401 is configured to automatically send a battery status level to the different digital phone immediately after the second is verified. This may be useful to the owner to know how much battery life the portable digital phone 400 has. The status level may also indicate that the portable digital phone 400 is presently at 100% for the battery status level and being powered by Alternating Current (AC) power. This occurs when the portable digital phone 400 is being charged.

In one case, the portable digital phone 400 is also a dual PDA device.

It is also noted that the portable handheld devices and the portable digital phone 400 discussed throughout can communicate, via an agent service (302, 401, method 100, and/or method 200), to the remote handheld device or different digital phone using SMS text messages, emails, and/or Instant messages that are sent back to the remote handheld device or different digital phone. Also, as noted in some cases, the emails may be associated or retrieved via a device that is different from the remote handheld device or different digital phone.

One now fully appreciates how a portable handheld device that is physically not accessible to its owner can still be used and accessed so that the owner can continue to stay up-to-date on important calls and messages and so that the owner can retrieve other needed information that resides on the portable handheld device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method that is adapted to executed by a processor on a portable device to perform the method, comprising:
    receiving, at a portable device, a message from a remote portable device;
    inspecting, at the portable device, the message and detecting an email address in the body of the message;
    validating, at the portable device, the email address is associated with an owner registered to the portable device;
    sending, from the portable device, a code to the email address;
    acquiring, at the portable device, a second message having the code; and
    configuring the portable handheld device to forward subsequent incoming messages or voice calls to the remote portable device.

2. The method of claim 1 further comprising, processing the method on a phone that is the portable device.

3. The method of claim 1, wherein receiving the message further includes receiving the message as a text message via a Short Message Service (SMS) protocol over a wireless communication service provider network.

4. The method of claim 3, wherein receiving the message further includes recognizing the remote portable device as a different phone.

5. The method of claim 1, wherein inspecting further includes identifying the email address as a previously registered email address provided previously by the owner, and registered with the method on the portable device by the owner.

6. The method of claim 1, wherein configuring further includes forwarding calendar information included on the portable device in response to an instruction included with the second message.

7. The method of claim 1, wherein configuring further includes forwarding one or more of the following in response to an instruction included with the second message: pictures, videos, files, music, and audio messages.

* * * * *